(12) United States Patent
Thakur et al.

(10) Patent No.: US 9,778,658 B2
(45) Date of Patent: Oct. 3, 2017

(54) PATTERN DETECTION USING PROBE DATA

(71) Applicant: Nissan North America, Inc., Franklin, TN (US)

(72) Inventors: Siddharth Thakur, Milipitas, CA (US); Daisuke Saito, Sunnyvale, CA (US)

(73) Assignee: Nissan North America, Inc., Franklin, TN (US)

( * ) Notice: Subject to any disclaimer, the term of this patent is extended or adjusted under 35 U.S.C. 154(b) by 115 days.

(21) Appl. No.: 14/657,127

(22) Filed: Mar. 13, 2015

(65) Prior Publication Data

US 2016/0265922 A1    Sep. 15, 2016

(51) Int. Cl.
*G05D 1/02*     (2006.01)
*G01C 21/34*    (2006.01)

(52) U.S. Cl.
CPC ....... *G05D 1/0212* (2013.01); *G01C 21/3484* (2013.01)

(58) Field of Classification Search
CPC . G07C 5/00; G07C 5/008; G07C 5/02; G07C 5/08; G07C 5/0808; G01C 21/00; G01C 21/26; G01C 21/34; G01C 21/3469; G01C 21/3484; G05D 1/0274; G05D 1/021; G05D 1/0088; G05D 1/0217; G05D 1/0212; B60W 2530/14; B60W 2050/0089; B60W 2540/28; B60W 2540/30; B60W 40/09; G08G 1/0137; G08G 1/096725
See application file for complete search history.

(56) References Cited

U.S. PATENT DOCUMENTS

| 4,656,950 | A | 4/1987 | Rhoton |
| 5,910,782 | A | 6/1999 | Schmitt et al. |
| 6,308,133 | B1 * | 10/2001 | Loffert ............ G01C 21/26 340/995.19 |

(Continued)

FOREIGN PATENT DOCUMENTS

| EP | 2568310 A2 | 3/2013 |
| JP | 2013-182551 A | 9/2013 |
| WO | 2013-169182 A1 | 11/2013 |

*Primary Examiner* — Thomas G Black
*Assistant Examiner* — Sze-Hon Kong
(74) *Attorney, Agent, or Firm* — Young Basile Hanlon & MacFarlane, P.C.

(57) ABSTRACT

A method and apparatus for associating a person with a portion of transportation network information based on vehicle operating information are described. The information includes a plurality of destinations. First vehicle operating information for a vehicle is identified, which information includes a first plurality of vehicle operations occurring during a first plurality of time windows. First values for a plurality of features are extracted from the first plurality of vehicle operations. A portion of the vehicle transportation network is associated with an owner/operator of the vehicle based on the first values. For consecutive time windows thereafter, second values for the features are extracted from second vehicle operating information for the vehicle that includes a second plurality of vehicle operations occurring during the consecutive time windows. Based on changes, a determination can be made as to whether an identity of the person associated with the vehicle has changed over time.

18 Claims, 8 Drawing Sheets

(56) References Cited

U.S. PATENT DOCUMENTS

| | | | |
|---|---|---|---|
| 6,438,472 B1* | 8/2002 | Tano | G01C 21/26 701/25 |
| 6,640,188 B2 | 10/2003 | Hashida | |
| 7,516,010 B1 | 4/2009 | Kaplan et al. | |
| 7,783,421 B2 | 8/2010 | Arai et al. | |
| 8,024,112 B2* | 9/2011 | Krumm | G01C 21/3617 340/990 |
| 8,452,771 B2 | 5/2013 | Kurciska et al. | |
| 8,566,029 B1 | 10/2013 | Lopatenko et al. | |
| 8,606,492 B1* | 12/2013 | Botnen | G07C 5/008 701/123 |
| 8,634,980 B1* | 1/2014 | Urmson | G05D 1/0214 701/23 |
| 8,655,588 B2 | 2/2014 | Wong et al. | |
| 8,694,232 B2 | 4/2014 | Kono et al. | |
| 8,768,539 B1 | 7/2014 | Clement et al. | |
| 8,896,685 B2 | 11/2014 | Ihara et al. | |
| 9,058,703 B2 | 6/2015 | Ricci | |
| 9,151,628 B1 | 10/2015 | Saito et al. | |
| 9,418,491 B2* | 8/2016 | Phillips | G07C 5/0808 |
| 2005/0071082 A1 | 3/2005 | Ohmura et al. | |
| 2006/0184013 A1 | 8/2006 | Emanuel et al. | |
| 2008/0109127 A1 | 5/2008 | Ozaki | |
| 2009/0030885 A1* | 1/2009 | DePasquale | G06Q 10/02 |
| 2009/0125174 A1 | 5/2009 | Delean | |
| 2009/0174540 A1* | 7/2009 | Smith | B60Q 1/34 340/465 |
| 2010/0109445 A1 | 5/2010 | Kurs et al. | |
| 2010/0256836 A1 | 10/2010 | Mudalige | |
| 2010/0256908 A1 | 10/2010 | Shimshoni et al. | |
| 2011/0106429 A1* | 5/2011 | Poppen | G01C 21/3476 701/533 |
| 2012/0089326 A1* | 4/2012 | Bouve | G01C 21/00 701/411 |
| 2012/0256588 A1* | 10/2012 | Hayashi | B60L 3/12 320/109 |
| 2012/0271778 A1 | 10/2012 | Atkins et al. | |
| 2012/0303254 A1* | 11/2012 | Kirsch | G07C 5/0808 701/123 |
| 2013/0060461 A1 | 3/2013 | Wong et al. | |
| 2013/0073112 A1* | 3/2013 | Phelan | G06Q 40/00 701/1 |
| 2013/0073114 A1* | 3/2013 | Nemat-Nasser | B60W 40/09 701/1 |
| 2013/0211699 A1 | 8/2013 | Scharmann et al. | |
| 2013/0211705 A1 | 8/2013 | Geelan et al. | |
| 2013/0231824 A1 | 9/2013 | Wilson et al. | |
| 2013/0344856 A1* | 12/2013 | Silver | H04M 1/72577 455/418 |
| 2014/0036076 A1 | 2/2014 | Nerayoff et al. | |
| 2014/0058634 A1 | 2/2014 | Wong et al. | |
| 2014/0113619 A1* | 4/2014 | Tibbitts | G07C 5/008 455/419 |
| 2014/0180727 A1* | 6/2014 | Freiberger | G07C 5/008 705/4 |
| 2014/0236719 A1 | 8/2014 | Szostak et al. | |
| 2014/0285361 A1 | 9/2014 | Tippelhofer et al. | |
| 2014/0320318 A1 | 10/2014 | Victor et al. | |
| 2014/0350853 A1 | 11/2014 | Proux | |
| 2015/0039391 A1* | 2/2015 | Hershkovitz | G06Q 10/04 705/7.31 |
| 2015/0106010 A1 | 4/2015 | Martin et al. | |
| 2015/0134185 A1 | 5/2015 | Lee | |
| 2015/0141043 A1 | 5/2015 | Abramson et al. | |
| 2015/0237662 A1* | 8/2015 | Fischer | B60K 37/00 455/41.3 |
| 2015/0248131 A1 | 9/2015 | Fairfield et al. | |
| 2015/0248689 A1 | 9/2015 | Paul et al. | |
| 2015/0319093 A1* | 11/2015 | Stolfus | H04L 47/122 370/237 |
| 2015/0346718 A1* | 12/2015 | Stenneth | G06Q 30/0611 701/2 |
| 2015/0377635 A1 | 12/2015 | Beaurepaire et al. | |
| 2016/0003636 A1 | 1/2016 | Ng-Thow-Hing et al. | |
| 2016/0047660 A1* | 2/2016 | Fausten | B60W 50/12 701/25 |
| 2016/0055419 A1* | 2/2016 | Fischer | G06N 5/048 706/12 |
| 2016/0071333 A1* | 3/2016 | Haidar | G07C 5/006 701/29.3 |
| 2016/0125673 A1* | 5/2016 | Bromham | G01C 21/26 701/115 |
| 2016/0144865 A1* | 5/2016 | Stadler | B60W 40/09 701/36 |
| 2016/0247095 A1* | 8/2016 | Scicluna | G06Q 10/02 |
| 2016/0253707 A1* | 9/2016 | Momin | G06Q 30/0266 |

* cited by examiner

PATTERN DETECTION USING PROBE DATA

TECHNICAL FIELD

This disclosure relates to vehicle operation, including routing and navigation.

BACKGROUND

A vehicle may include a control system that may generate and maintain the route of travel and may control the vehicle to traverse the route of travel. An autonomous vehicle may be controlled autonomously, without direct human intervention, to traverse a route of travel from an origin to a destination. Often this information is based on the identity of a person associated with the vehicle. It may be advantageous to detect changes in patterns in data related to the operation of the vehicle so that this data can be changed in the event of a change in the person.

SUMMARY

Disclosed herein are aspects, features, elements, implementations and embodiments of detecting changes in patterns in data related to the operation of a vehicle. In this way, for example, changes in a person associated with the vehicle (e.g., ownership) may be identified.

According to an aspect of the disclosed embodiments, a vehicle includes a processor that is configured to execute instructions stored on a non-transitory computer readable medium to identify vehicle transportation network information representing a vehicle transportation network, wherein the vehicle transportation network includes a plurality of destinations, and wherein identifying the vehicle transportation network information includes identifying the vehicle transportation network information such that the vehicle transportation network information describes an association of a portion of the vehicle transportation network with a person associated with the vehicle based at least in part on an automatically identified association between the person associated with the vehicle and vehicle operating information of the vehicle, determine a target destination from the plurality of destinations based on the vehicle transportation network information and the person associated with the vehicle, and identify a route from an origin to the target destination in the vehicle transportation network using the vehicle transportation network information. A trajectory controller is configured to operate the vehicle to travel from the origin to the target destination using the route.

Another aspect of the disclosed embodiments is a vehicle including a processor configured to execute instructions stored on a non-transitory computer readable medium to identify vehicle transportation network information representing a vehicle transportation network, wherein the vehicle transportation network includes a plurality of destinations, and wherein identifying the vehicle transportation network information includes identifying the vehicle transportation network information such that the vehicle transportation network information describes an association of a portion of the vehicle transportation network with a person associated with the vehicle based at least in part on an automatically identified association between the person associated with the vehicle and vehicle operating information of the vehicle, wherein the portion of the vehicle transportation network includes at least some of the plurality of destinations, determine a change in the person associated with the vehicle, determine a target destination from the plurality of destinations based on the vehicle transportation network information, the target destination based on the change in the person associated with the vehicle, and identify a route from an origin to the target destination in the vehicle transportation network using the vehicle transportation network information. A trajectory controller is configured to operate the vehicle to travel from the origin to the target destination using the route.

Another aspect of the disclosed embodiments is a system for generating vehicle transportation network information that may include a memory including a non-transitory computer readable medium and a processor configured to execute instructions stored on the non-transitory computer readable medium to identify vehicle transportation network information representing a vehicle transportation network, the vehicle transportation network information including a plurality of destinations, identify first vehicle operating information for the single vehicle, wherein the first vehicle operating information includes a first plurality of vehicle operations occurring during a first plurality of time windows, extract first values for a plurality of features from the first plurality of vehicle operations, associate a portion of the vehicle transportation network with a person associated with a single vehicle based on the first values, for consecutive time windows after the first plurality of time windows, extract second values for the plurality of features from second vehicle operating information for the single vehicle, wherein the second vehicle operating information includes a second plurality of vehicle operations occurring during the consecutive time windows, and determine whether an identity of the person associated with the single vehicle has changed over time based on changes between the second values for the plurality of features and the first values for the plurality of features.

Variations in these and other aspects, features, elements, implementations and embodiments of the methods, apparatus, procedures and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
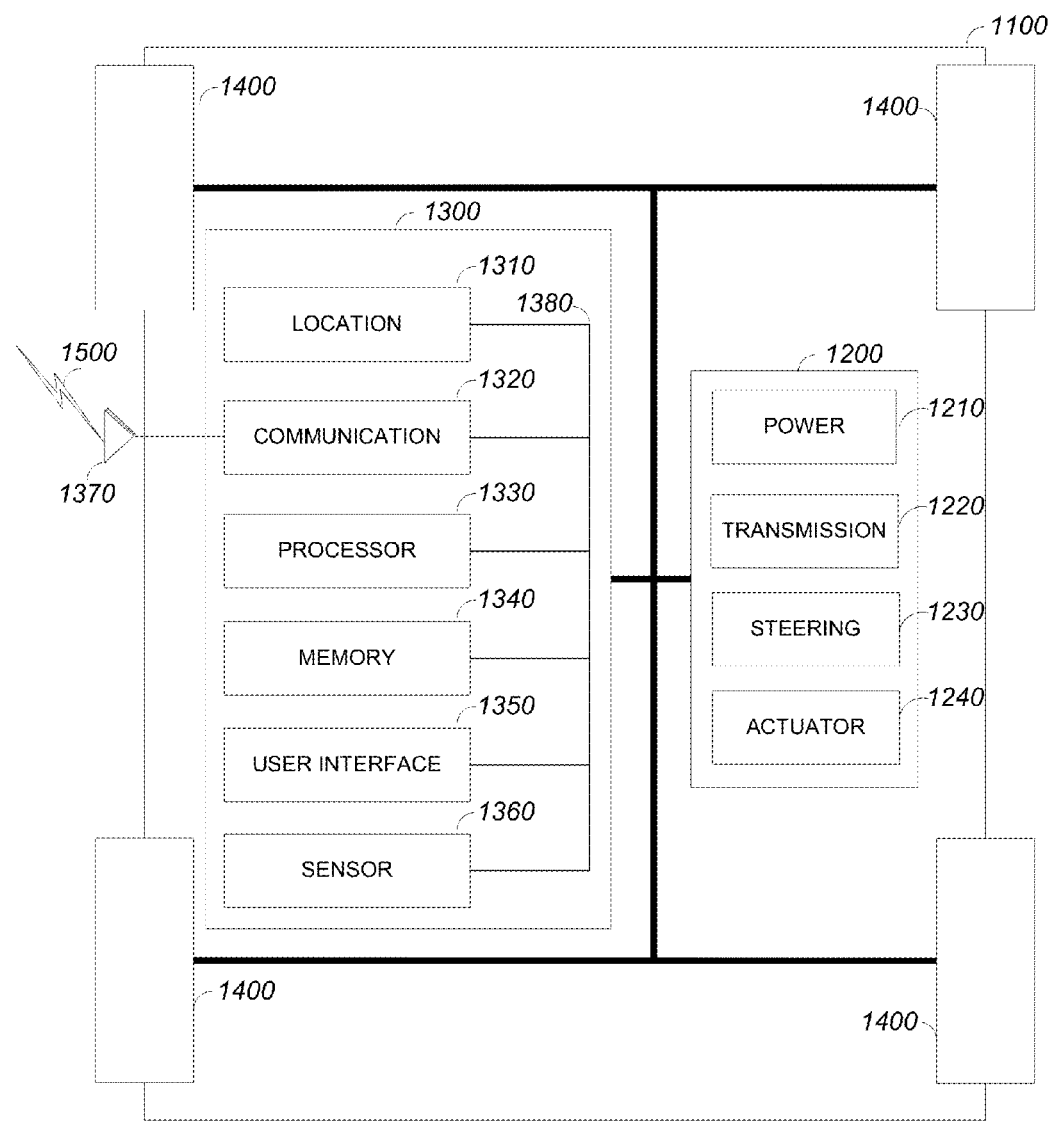
FIG. 1 is a diagram of an example of a portion of an autonomous vehicle in which the aspects, features and elements disclosed herein may be implemented.

An autonomous vehicle may travel from a point of origin to a destination in a vehicle transportation network without human intervention. The autonomous vehicle may include a controller, which may perform autonomous vehicle routing and navigation. The controller may generate a route of travel from the origin to the destination based on vehicle information, environment information, vehicle transportation network information representing the vehicle transportation network, or a combination thereof. The controller may output the route of travel to a trajectory controller that may operate the vehicle to travel from the origin to the destination using the generated route.

In some embodiments, the vehicle transportation network information may include information that associates a person that is associated with a vehicle with data within the vehicle transportation network. For example, the person may be the owner or operator of the vehicle and the information may be information such the location of the person's home or work, or information related to preferred sources of services, such as service stations, etc. In these and other situations involving telematics services to vehicles, there may be a desire to change access available to a subsequent person associated with the vehicle, such as a new owner. In many cases, the first person associated with the vehicle would terminate the access rights to the personalized vehicle transportation network information before transfer of the vehicle. In others, the second person associated with the vehicle would request termination of the access rights to the personalized vehicle transportation network information, including any new associations generated for or by the second person, upon receipt of the vehicle.

At times, however, neither person changes access rights. According to the teachings herein, the failure of either person to change access rights may be addressed by identifying changes in patterns in vehicle operating conditions over time. This prevents inadvertent access to information by either person. While this description discusses change of ownership as an example, the teachings may be applied to other situations where the identity of a person associated with a vehicle changes—such as to a change of an operator of a vehicle. Further, the teachings may be applied to situations other than a change of owner or operator. In some embodiments, for example, this disclosure may be used to identify changes in the patterns formed by the original person associated with the vehicle, such as a change in home or work address of the person.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features and elements are described herein in particular combinations, each aspect, feature or element may be used independently or in various combinations with or without other aspects, features and elements.

FIG. 1 is a diagram of an example of an autonomous vehicle in which the aspects, features and elements disclosed herein may be implemented. In some embodiments, an autonomous vehicle 1000 may include a chassis 1100, a powertrain 1200, a controller 1300, wheels 1400, or any other element or combination of elements of an autonomous vehicle. Although the autonomous vehicle 1000 is shown as including four wheels 1400 for simplicity, any other propulsion device or devices, such as a propeller or tread, may be used. In FIG. 1, the lines interconnecting elements, such as the powertrain 1200, the controller 1300 and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the autonomous vehicle 1000, which may include accelerating, decelerating, steering, or otherwise controlling the autonomous vehicle 1000.

The powertrain 1200 may include a power source 1210, a transmission 1220, a steering unit 1230, an actuator 1240, or any other element or combination of elements of a powertrain, such as a suspension, a drive shaft, axels, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300, the actuator 1240, or both. The steering unit 1230 may be controlled by the controller 1300, the actuator 1240, or both, and may control the wheels 1400 to steer the autonomous vehicle 1000. The vehicle actuator 1240 may receive signals from the controller 1300 and may actuate or control the power source 1210, the transmission 1220, the steering unit 1230, or any combination thereof to operate the autonomous vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof, may be integrated in one or more electronic units, circuits, or chips.

In some embodiments, the processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively couple with the memory 1340 via a communication bus 1380.

The memory 1340 may include any tangible non-transitory computer-usable or computer-readable medium capable of, for example, containing, storing, communicating, or transporting machine-readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface 1370 may be configured to communicate via multiple communication links.

The communication unit 1320 may be configured to transmit or receive signals via the wired or wireless medium 1500, such as via the communication interface 1370. Although not explicitly shown in FIG. 1, the communication unit 1320 may be configured to transmit, receive, or both, via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used.

The location unit 1310 may determine geolocation information, such as longitude, latitude, elevation, direction of travel, or speed, of the autonomous vehicle 1000. For example, the location unit may include a global positioning system (GPS) unit, a radio triangulation unit, or a combination thereof. The location unit 1310 can be used to obtain information that represents, for example, a current heading of the autonomous vehicle 1000, a current position of the autonomous vehicle 1000 in two or three dimensions, a current angular orientation of the autonomous vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person and/or a touch display for performing visual and touch-based communication with the person.

The sensor 1360 often includes one or more sensors 1360, such as an array of sensors, which may be operable to provide information that may be used to control the vehicle 1000. The sensor 1360 may provide information regarding current operating characteristics of the vehicle. When multiple sensors 1360 are included, they can include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensors 1360 may include sensors that are operable to obtain information regarding the physical environment surrounding the autonomous vehicle 1000. For example, one or more sensors may detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof. The trajectory controller may be implemented, at least in part, using one or more elements of the controller 1300.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, the vehicle 1000 may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
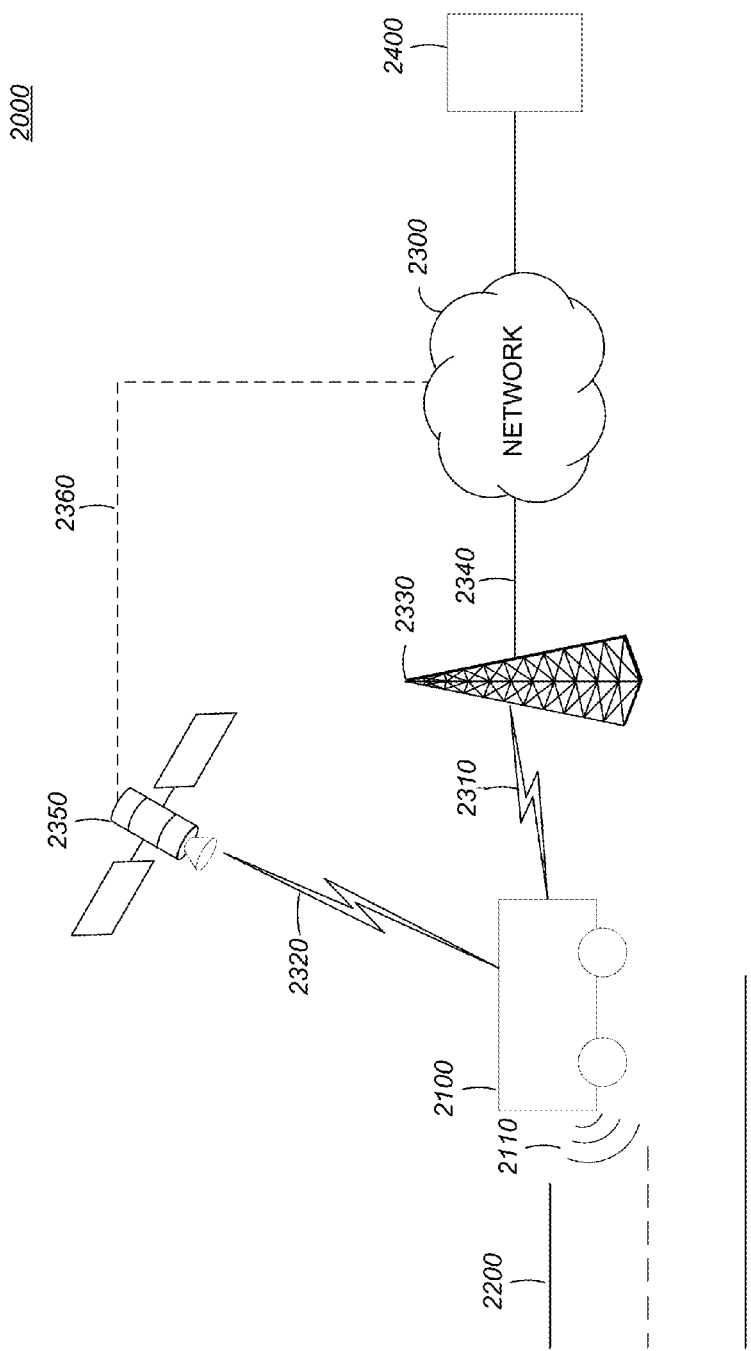
FIG. 2 is a diagram of an example of a portion of an autonomous vehicle transportation and communication system in which the aspects, features and elements disclosed herein may be implemented.

FIG. 2 is a diagram of an example of a portion of an autonomous vehicle transportation and communication system in which the aspects, features and elements disclosed herein may be implemented. The autonomous vehicle transportation and communication system 2000 may include one or more autonomous vehicles 2100, such as the autonomous vehicle 1000 shown in FIG. 1, which may travel via one or more portions of one or more vehicle transportation networks 2200, and may communicate via one or more electronic communication networks 2300. Although not explicitly shown in FIG. 2, an autonomous vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between the autonomous vehicle 2100 and one or more communicating devices 2400. For example, an autonomous vehicle 2100 may receive information, such as information representing the vehicle transportation network 2200, from a communicating device 2400 via the network 2300.

In some embodiments, an autonomous vehicle 2100 may communicate via a wired communication link (not shown), a wireless communication link 2310/2320, or a combination of any number of wired or wireless communication links. For example, as shown, an autonomous vehicle 2100 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, the autonomous vehicle 2100 may communicate with the communications network 2300 via an access point 2330. The access point 2330, which may include a computing device, may be configured to communicate with an autonomous vehicle 2100, with a communication network 2300, with one or more communicating devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, the access point 2330 may include any number of interconnected elements.

In some embodiments, the autonomous vehicle 2100 may communicate with the communications network 2300 via a satellite 2350, or other non-terrestrial communication device. The satellite 2350, which may include a computing device, may be configured to communicate with an autonomous vehicle 2100, with a communication network 2300, with one or more communicating devices 2400, or with a combination thereof via one or more communication links 2320/2360. Although shown as a single unit, the satellite 2350 may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, an autonomous vehicle 2100 may identify a portion or condition of the vehicle transportation network 2200. For example, the autonomous vehicle 200 may include one or more on-vehicle sensors 2110, such as sensor(s) 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, the autonomous vehicle 2100 may traverse a portion or portions of one or more vehicle transportation networks 2200 using information communicated via the network 2300, such as information representing the vehicle transportation network 2200, information identified by one or more on-vehicle sensors 2110, or a combination thereof.

Although for simplicity FIG. 2 shows one autonomous vehicle 2100, one vehicle transportation network 2200, one electronic communication network 2300, and one communicating device 2400, any number of autonomous vehicles, networks, or computing devices may be used. In some embodiments, the autonomous vehicle transportation and communication system 2000 may include devices, units or elements not shown in FIG. 2. Although the autonomous vehicle 2100 is shown as a single unit, the autonomous vehicle 2100 may include any number of interconnected elements.

Figure 3:
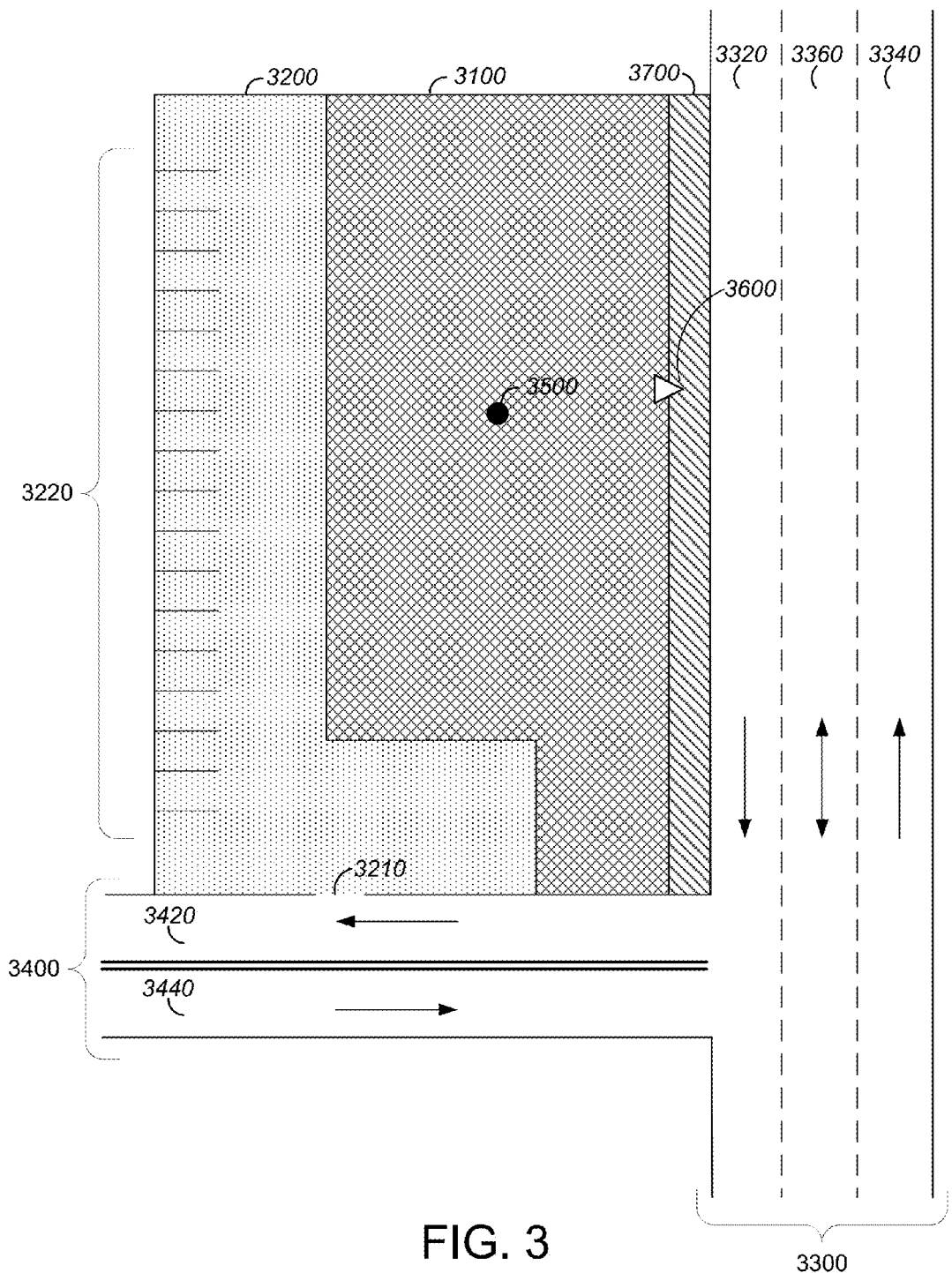
FIG. 3 is a diagram of a portion of a vehicle transportation network in accordance with this disclosure.

FIG. 3 is a diagram of a portion of a vehicle transportation network 3000 in accordance with this disclosure. A vehicle transportation network 3000 may include one or more unnavigable areas, such as a building 3100, one or more partially navigable areas, such as parking area 3200, one or more navigable areas, such as roads 3300/3400, or a combination thereof. In some embodiments, an autonomous vehicle, such as the autonomous vehicle 1000 shown in FIG. 1 or the autonomous vehicle 2100 shown in FIG. 2, may traverse a portion or portions of the vehicle transportation network 3000.

The vehicle transportation network may include one or more interchanges 3210 between one or more navigable, or partially navigable, areas 3200/3300/3400. For example, the portion of the vehicle transportation network shown in FIG. 3 includes an interchange 3210 between the parking area 3200 and road 3400. In some embodiments, the parking area 3200 may include parking slots 3220.

A portion of the vehicle transportation network, such as a road 3300/3400 may include one or more lanes 3320/3340/3360/3420/3440, and may be associated with one or more directions of travel, which are indicated by arrows in FIG. 3.

In some embodiments, a vehicle transportation network, or a portion thereof, such as the portion of the vehicle transportation network shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, or a combination thereof.

In some embodiments, a portion, or a combination of portions, of the vehicle transportation network may be identified as a point of interest or a destination. For example, the vehicle transportation network information may identify the building 3100 as a point of interest, an autonomous vehicle may identify the point of interest as a destination, and the autonomous vehicle may travel from an origin to the destination by traversing the vehicle transportation network.

In some embodiments, identifying a destination may include identifying a location for the destination, which may be a discrete uniquely identifiable geolocation, such as the geographic location 3500 for the building 3100. For example, the vehicle transportation network may include a defined location, such as a street address, a postal address, a vehicle transportation network address, a longitude and latitude, or a GPS address, for the destination.

In some embodiments, a destination may be associated with one or more entrances, such as the entrance 3600 shown in FIG. 3. In some embodiments, the vehicle transportation network information may include defined or predicted entrance location information, such as information identifying a geolocation of an entrance associated with a destination.

In some embodiments, the vehicle transportation network may be associated with, or may include, a pedestrian transportation network. For example, FIG. 3 includes a portion 3700 of a pedestrian transportation network, which may be a pedestrian walkway. In some embodiments, a pedestrian transportation network, or a portion thereof, such as the portion 3700 of the pedestrian transportation network shown in FIG. 3, may be represented as pedestrian transportation network information. In some embodiments, the vehicle transportation network information may include pedestrian transportation network information. A pedestrian transportation network may include pedestrian navigable areas. A pedestrian navigable area, such as a pedestrian walkway or a sidewalk, may correspond with a non-navigable area of a vehicle transportation network. Although not shown separately in FIG. 3, a pedestrian navigable area, such as a pedestrian crosswalk, may correspond with a navigable area, or a partially navigable area, of a vehicle transportation network.

Figure 4:
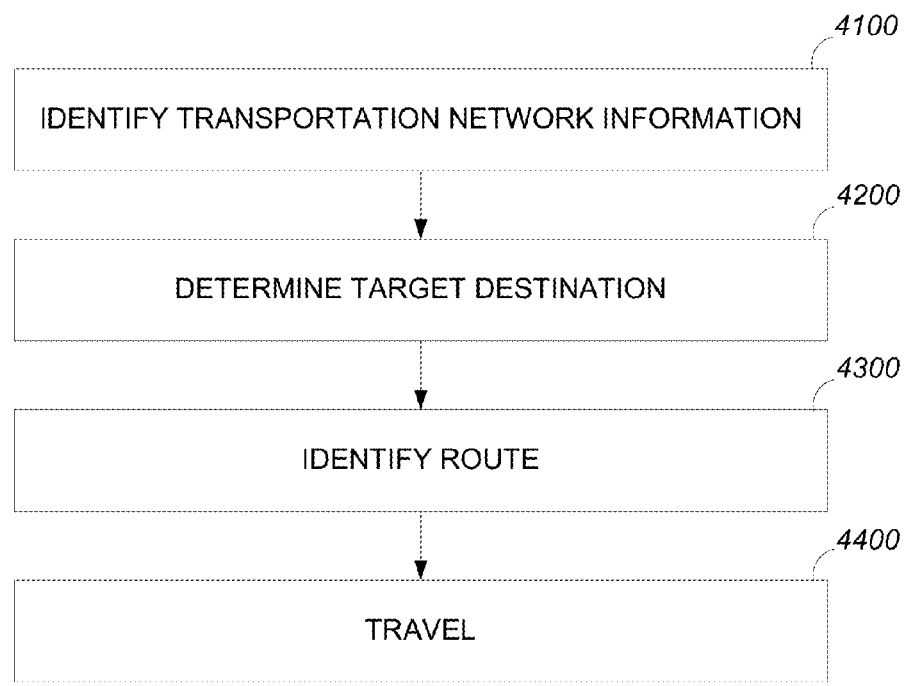
FIG. 4 is a diagram of a method of autonomous vehicle navigation and routing in accordance with this disclosure.

FIG. 4 is a diagram of a method of autonomous vehicle navigation and routing in accordance with this disclosure. Autonomous vehicle navigation and routing may be implemented in an autonomous vehicle, such as the autonomous vehicle 1000 shown in FIG. 1 or the autonomous vehicle 2100 shown in FIG. 2. For example, the processor 1330 of the controller 1300 of the autonomous vehicle 1000 shown in FIG. 1 may execute instructions stored on the memory 1340 of the controller 1300 of the autonomous vehicle 1000 shown in FIG. 1 to perform autonomous vehicle navigation and routing. Implementations of autonomous vehicle navigation and routing may include identifying vehicle transportation network information at 4100, determining a target parking location at 4200, identifying a route at 4300, traveling at 4400, or a combination thereof.

In some embodiments, vehicle transportation network information, such as the vehicle transportation network information shown in FIG. 3, may be identified at 4100. For example, an autonomous vehicle control unit, such as the controller 1300 shown in FIG. 1, may read the vehicle transportation network information from a data storage unit, such as the memory 1340 shown in FIG. 1, or may receive the vehicle transportation network information from an external data source, such as the communicating device 2400 shown in FIG. 2, via a communication system, such as the electronic communication network 2300 shown in FIG. 2. In some embodiments, identifying the vehicle transportation network information may include transcoding or reformatting the vehicle transportation network information, storing the reformatted vehicle transportation network information, or both.

In some embodiments, the vehicle transportation network may have a portion, such as the geographic location 3500 and/or another destination or location, associated with the vehicle and hence with a person associated with the vehicle according to the teachings herein. Such portions could be used in routing and navigation of the vehicle.

In some embodiments, a destination may be identified at 4200. Identifying a destination may include identifying a point of interest, such as the building 3100 shown in FIG. 3 as a destination or a short-term stopping point. This point of interest may be within the portion of the vehicle transportation network associated with the person associated with the vehicle.

A route may be generated at 4300. In some embodiments, generating the route may include identifying an origin. For example, the origin may indicate a target starting point, such as a current location of the autonomous vehicle. In some embodiments, identifying the origin may include controlling a location unit, such as the location unit 1310 shown in FIG. 1, to determine a current geographic location of the autonomous vehicle. In some embodiments, identifying the origin at 5300 may include identifying vehicle transportation network information corresponding to the origin. For example, identifying the origin may include identifying a road, road segment, lane, waypoint, or a combination thereof. In some embodiments, the current location of the autonomous vehicle may be a navigable non-road area or an area that is not expressly or completely included in a vehicle transportation network, such as an off-road area, and identifying the origin may include identifying a road, road segment, lane, waypoint, or a combination thereof, near, or proximal to, the current location of the autonomous vehicle. Generating the route may include determining a route from the origin to the target destination identified at 4200, or generating a route from the origin to a short-term stopping point associated with the target destination, and generating a route from the short-term stopping point to the target destination identified at 4200. For simplicity and clarity, the description herein refers to routing and navigation between an origin and a target destination; however, routing and navigation may include routing and navigation between the origin and more than one point between the origin and the target destination and routing and navigation between one of these points and the target destination.

In some embodiments, generating the route may include generating candidate routes from the origin to the target destination. In some embodiments, a candidate route may represent a unique or distinct route from the origin to the target destination. For example, a candidate route may include a unique or distinct combination of roads, road segments, lanes, waypoints and interchanges.

In some embodiments, generating the route may include identifying routing states. In some embodiments, identifying routing states may include identifying a routing state corresponding to each waypoint in a candidate route, for each of the candidate routes. For example, a first routing state may indicate a road, a road segment, a lane, a waypoint, or a combination thereof, in a first candidate route, and a second routing state may indicate the road, the road segment, the lane, the waypoint, or the combination thereof, in a second candidate route.

In some embodiments, generating the route may include evaluating the expected action costs for performing an action, such as transitioning from one routing state to another, which may correspond with transitioning from one waypoint to another, and may represent the expected cost of the autonomous vehicle traveling from one location, represented by the first waypoint, to another location, represented by the second waypoint, during execution of the route. In some embodiments, an action may indicate a transition from a routing state to an immediately adjacent routing state, which may correspond with transitioning from a waypoint to an immediately adjacent waypoint without intersecting another waypoint, and may represent an autonomous vehicle traveling from a location, represented by the first waypoint, to another location, represented by the immediately adjacent waypoint.

In some embodiments, an action cost may be determined based on the vehicle transportation network information. For example, within a candidate route, a first routing state may correspond with a first waypoint, which may correspond with a first location in the vehicle transportation network, a second routing state may correspond with a second waypoint, which may correspond with second location in the vehicle transportation network, and the action cost may represent an estimated, predicted or expected cost for the autonomous vehicle to travel from the first location to the second location. In some embodiments, action costs may be context dependent. For example, the action cost for transitioning between two waypoints at one time of day may be significant higher than the action costs for transitioning between the waypoints at another time of day.

In some embodiments, generating the route may include generating probability distributions. In some embodiments, generating the probability distributions may include generating a probable cost distribution for performing an action, such as transitioning from one routing state to another. Generating a probably cost distribution may include determining a probability of successfully performing an action, the probability of failing to perform the action, determining multiple possible costs for performing the action, determining probable costs associating probabilities with possible costs, or a combination thereof.

In some embodiments, generating a probability distribution may include using a normal, or Gaussian, distribution, $N(\mu, \sigma)$, where $\mu$ indicates the mean of the normal distribution, and $\sigma$ indicates the standard deviation. The mean of the normal distribution and the standard deviation may vary from one action to another. In some embodiments, the standard deviation may be augmented based on an action cost uncertainty variance modifier, which may represent variation in the uncertainty of action costs.

In some embodiments, generating a probability distribution may include generating discrete cost probability combinations for an action. For example, for an action in a route, generating a probability distribution may include generating a first probable cost as a combination of a first action cost, such as 45, and a first probability, such as 0.05, and generating a second probable cost as a combination of a second action cost, such as 50, and a second probability, such as 0.08.

In some embodiments, generating a probability distribution may include using a liner model of resources and costs. For example, the probability distribution for the travel time associated with an action may be represented by piece-wise constant functions, and the costs for performing an action may be represented by piece-wise linear functions.

In some embodiments, determining the action cost may include evaluating cost metrics, such as a distance cost metric, a duration cost metric, a fuel cost metric, an acceptability cost metric, or a combination thereof. In some embodiments, the cost metrics may be determined dynamically or may be generated, stored and accessed from memory, such as in a database. In some embodiments, determining the action cost may include calculating a cost function based on one or more of the metrics. For example, the cost function may be minimizing with respect to the distance cost metric, minimizing with respect to the duration cost metric, minimizing with respect to the fuel cost metric, and maximizing with respect to the acceptability cost metric.

A distance cost metric may represent a distance from a first location represented by a first waypoint corresponding to a first routing state to a second location represented by a second waypoint corresponding to a second routing state.

A duration cost metric may represent a predicted duration for traveling from a first location represented by a first waypoint corresponding to a first routing state to a second location represented by a second waypoint corresponding to a second routing state, and may be based on condition information for the autonomous vehicle and the vehicle transportation network, which may include fuel efficiency information, expected initial speed information, expected average speed information, expected final speed information, road surface information, or any other information relevant to travel duration.

A fuel cost metric may represent a predicted fuel utilization to transition from a first routing state to a second routing state, and may be based on condition information for the autonomous vehicle and the vehicle transportation network, which may include fuel efficiency information, expected initial speed information, expected average speed information, expected final speed information, road surface information, or any other information relevant to fuel cost.

An acceptability cost metric may represent a predicted acceptability for traveling from a first location represented by a first waypoint corresponding to a first routing state to a second location represented by a second waypoint corresponding to a second routing state, and may be based on condition information for the autonomous vehicle and the vehicle transportation network, which may include expected initial speed information, expected average speed information, expected final speed information, road surface information, aesthetic information, toll information, or any other information relevant to travel acceptability. In some embodiments, the acceptability cost metric may be based on acceptability factors. In some embodiments, an acceptability factor may indicate that a location, which may include a specified road or area, such as an industrial area, or a road type, such as a dirt road or a toll road, has a low or negative acceptability, or an acceptability factor may indicate that a location, such as road having a scenic view, has a high or positive acceptability factor.

In some embodiments, evaluating the cost metrics may include weighting the cost metrics and calculating the action cost based on the weighted cost metrics. Weighting a cost metric may include identifying a weighting factor associated with the cost metric. For example, identifying a weighting factor may include accessing a record indicating the weighting factor and an association between the weighting factor and the cost metric. In some embodiments, weighting a cost metric may include generating a weighted cost metric based on the weighting factor and the cost metric. For example, a weighted cost metric may be a product of the weighting factor and the cost metric. In some embodiments, estimating the action cost may include calculating a sum of cost metrics, or a sum of weighted cost metrics.

In some embodiments, generating the route may include identifying an optimal route. Identifying the optimal route may include selecting a candidate route from the candidate routes based on the probability distributions. For example, a candidate route having a minimal probable route cost may be identified as the optimal route. In some embodiments, identifying the optimal route may include using a constant time stochastic control process, such as a hybrid Markov decision process.

In some embodiments, identifying the optimal route may include selecting the minimum probable action cost from among an action cost probability distribution for transitioning from a first routing state to a second routing state and an action cost probability distribution for transitioning from the first routing state to a third routing state.

In some embodiments, identifying the optimal route may include generating a route cost probability distribution for a candidate route based on the action cost probability distributions for each action in the route. In some embodiments, identifying the optimal route may include generating a route cost probability distribution for each candidate route and selecting the candidate route with the lowest, or minimum, probable route cost as the optimal route.

In some embodiments, the controller may output or store the candidate routes, the optimal route, or both. For example, the controller may store the candidate routes and the optimal route and may output the optimal route to a trajectory controller, vehicle actuator, or a combination thereof, to operate the autonomous vehicle to travel from the origin to the target parking location using the optimal route.

In some embodiments, the vehicle may travel from the origin to the target destination using the optimal route at 4400. For example, an autonomous vehicle may include a vehicle actuator, such as the actuator 1240 shown in FIG. 1, and the vehicle actuator may operate the autonomous vehicle to begin traveling from the origin to the target destination using the optimal route. In some embodiments, the vehicle may include a trajectory controller and the trajectory controller may operate the vehicle to begin travelling based on the optimal route and current operating characteristics of the vehicle, and the physical environment surrounding the vehicle.

In some embodiments, the optimal route may be updated. In some embodiments, updating the optimal route may include updating or regenerating the candidate routes and probability distributions, and identifying the updated optimal route from the updated or regenerated candidate routes and probability distributions.

In some embodiments, the optimal route may be updated based on updated vehicle transportation network information, based on differences between actual travel costs and the probable costs of the selected route, or based on a combination of updated vehicle transportation network information and differences between actual travel costs and the probable costs of the selected route.

In some embodiments, the vehicle may receive current vehicle transportation network state information before or during travel. In some embodiments, the vehicle may receive current vehicle transportation network state information, such as off-vehicle sensor information, from an off-vehicle sensor directly, or via a network, such as the electronic communication network 2300 shown in FIG. 2. In some embodiments, the optimal route may be updated in response to receiving current vehicle transportation network state information. For example, the current vehicle transportation network state information may indicate a change of a state, such as a change from open to closed, of a portion of the vehicle transportation network that is included in the optimal route, updating the candidate routes may include removing candidate routes including the closed portion of the vehicle transportation network and generating new candidate routes and probability distributions using the current location of the autonomous vehicle as the origin, and updating the optimal route may include identifying a new optimal route from the new candidate routes.

In some embodiments, the vehicle may complete traveling to the target destination from the current location of the vehicle using the updated optimal route.

In some implementations, identifying the vehicle transportation network information at 4100 may include or be supplemented by a process that identifies associations between a person associated with a vehicle and the vehicle transportation network and updates those associations when the person associated with the vehicle changes. These associations may be identified by changes in vehicle operating information over time. Examples of such a process are shown in FIGS. 5-9. While this process is described as operating with autonomous vehicles, it can be implemented on non-autonomous vehicles.

Figure 5:
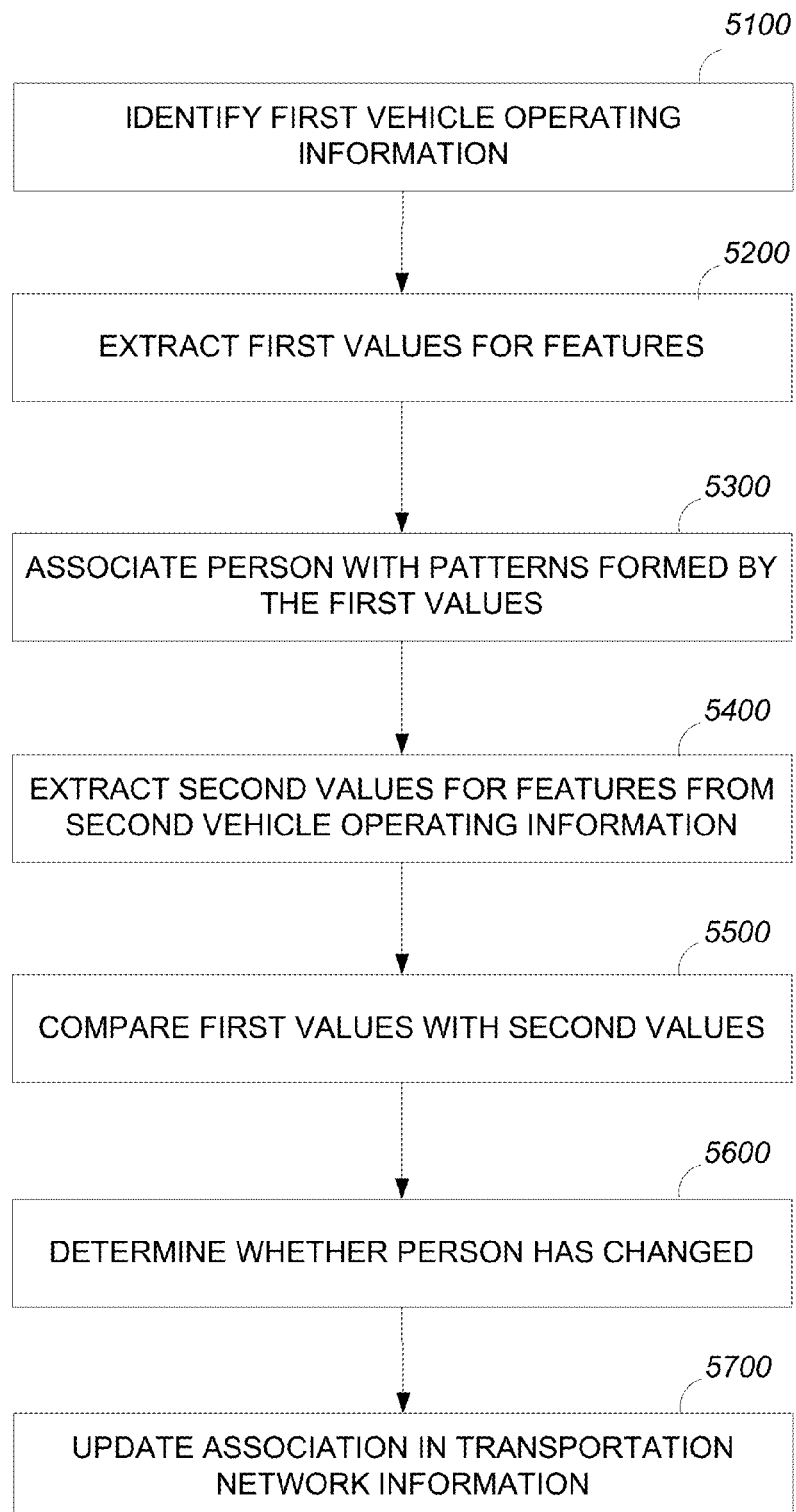
FIG. 5 is a diagram of a method of automatically updating an association of a person associated with a vehicle with a portion of transportation network information in accordance with this disclosure.
Figure 6:
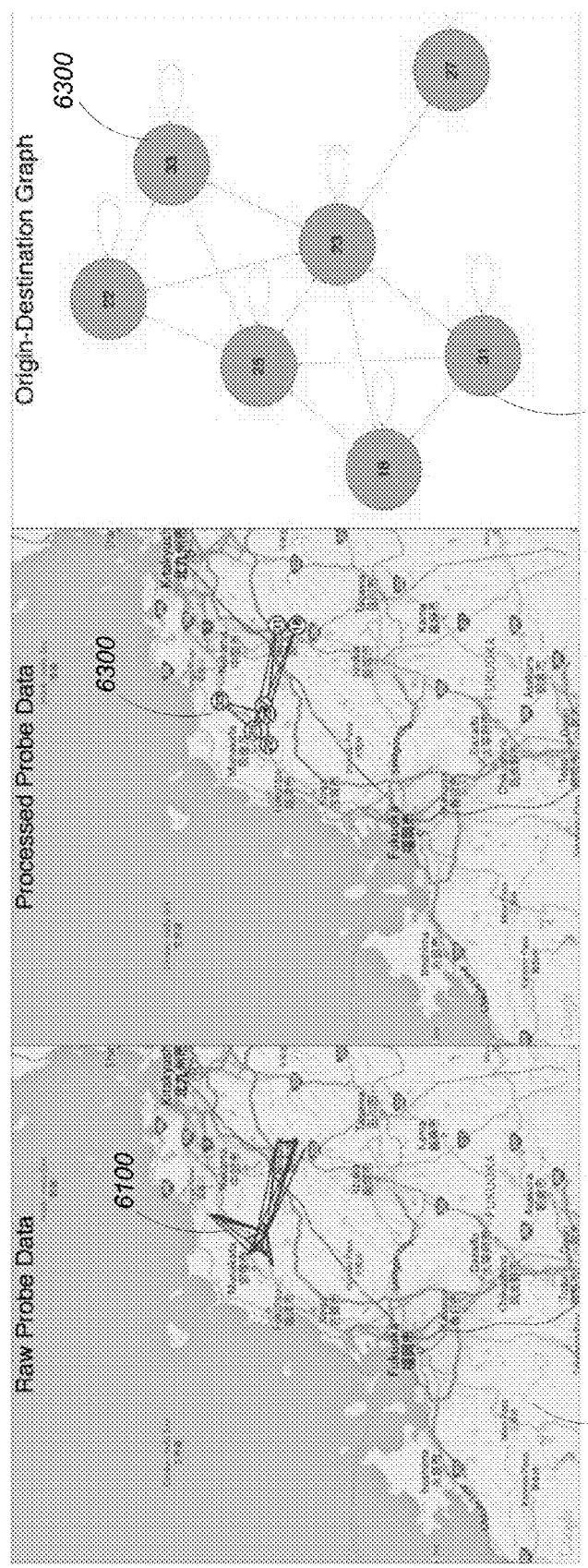
FIG. 6A is a diagram of raw probe data overlaid on a display of map data used to form the vehicle transportation network.
FIG. 6B is a diagram of the probe data of FIG. 6A processed in accordance with this disclosure.
FIG. 6C is a diagram of an origin-destination graph using the processed probe data of FIG. 6B for each location 18, 22, 23, 25, 27, 31 and 33.

FIG. 5 is a diagram of a method of automatically updating an association of a person associated with a vehicle with a portion of transportation network information in accordance with this disclosure. In some embodiments, automatically updating the association may include identifying first vehicle operating information at 5100, extracting first values for features within the first vehicle operating information at 5200, associating the person with patterns formed by the first values at 5300, extracting second values for the features from second vehicle operating information at 5400, comparing the first values with the second values at 5500, determining whether the person has changed at 5600, and updating the association within the transportation network information at 5700.

In some embodiments, first vehicle operating information may be identified at 5100. In some embodiments, the vehicle operating information may include operating information generated for a vehicle, which may be a manually operated vehicle, and may include vehicle probe data, vehicle location information, vehicle status information, vehicle event information, vehicle bus data, such as controller area network (CAN) data, or any other information generated based on vehicle operation.

In some embodiments, the vehicle operating information may include information reported by a vehicle, or an operational unit thereof, such as a data logging unit, a telemetry unit, a probe unit, an operational recorder, or any other unit or combination of units capable of detecting, storing or reporting an operation, or an operating condition, of a vehicle, such as a power-up operation, a start operation, a running operating condition, a stop operation, a power-down operation, a door opening operation, a door open operating condition, a door closing operation, a door closed operating condition, a door lock operation, a door locked operating condition, a door unlock operation, a door unlock operating condition, or any other operation or operating condition of the vehicle. In some embodiments, the vehicle operating information may include a time, a date, a geographic location, or a combination thereof, for one or more of the operations, or operating conditions. In some embodiments, the vehicle operating information may be information reported by the vehicle. For example, the vehicle operating information may include records where each record may be associated with a unique identifier of the vehicle.

In some embodiments, the vehicle operating information may include information indicating vehicle operations. A vehicle operation may include event indicators, which may include a type of vehicle operation or an event, such as start, stop, stand, park, door open, door close, load or unload. A vehicle operation may include a date, a time, or both. A vehicle operation may indicate a location, such as a GPS location within the vehicle transportation network. A vehicle operation may include vehicle state information, such as a current number of passengers or occupancy, a change in occupancy, or a passenger presence state. For example, the vehicle operating information may include information reported by a vehicle, or an operational unit thereof, such as a data logging unit, a telemetry unit, a probe unit, an operational recorder, or any other unit or combination of units capable of detecting, storing or reporting an operation, or an operating condition, of a vehicle, such as a power-up operation, a start operation, a running operating condition, a stop operation, a power-down operation, a door opening operation, a door open operating condition, a door closing operation, a door closed operating condition, a door lock operation, a door locked operating condition, a door unlock operation, a door unlock operating condition, or any other operation or operating condition of the vehicle. In some embodiments, the vehicle operating information may include a time, a date, a geographic location, or a combination thereof, for one or more of the operations, or operating conditions. For example, the vehicle operating information may indicate a vehicle operation including a stationary period, such as a period or duration between a vehicle stop event and a subsequent vehicle start event.

In some embodiments, the vehicle operating information may include passenger information, such as a passenger identifier. It may also include other information that is likely to be unique to a passenger, owner or operator such as wireless (e.g., Bluetooth or Wifi) device media access control (MAC) address and/or device name. Seat adjustment settings may also encompassed within the vehicle operating information.

In some embodiments, extracting first values for features at 5200 includes extracting values for features within the vehicle operating information that are not expected to change frequently for a person associated with a vehicle. The extracted values from the vehicle operating information may be acquired over multiple windows of time. For example, the extracted values may be acquired on a monthly basis, weekly basis, bi-weekly basis, or some other relevant period.

In some embodiments, the extracted values may include origin-destination pairs for the vehicle where each origin-destination pair comprises a location within the vehicle transportation network from which the vehicle departs for a trip paired with a location within the vehicle transportation network at which the vehicle arrives at an end of the trip. The extracted values may additionally or alternatively include locations where the vehicle is stationary for a time period. Due to the imprecision of GPS coordinates relative to map coordinates, extracted location data may be considered the same when they fall within a defined area within a map grid. Alternatively, an optional clustering technique that clusters probe data points representing locations where a vehicle has stopped for defined periods (e.g., parking lots) may be used. For example, a Delaunay triangulation based spatial clustering technique may be used to identify locations as origins or destinations.

In some embodiments, the extracted values may include the people within the vehicle for trips and optionally where they are seated based on, for example, changes in seat adjustment settings. In some embodiments, the extracted features may include the energy consumption (electric or gas) of the vehicle during each window of time. This may be identified by charge levels for the vehicle or by the volume of gas associated with each fill of a tank in some implementations.

The extracted values may be filtered from larger groups of extracted values related to the vehicle operating information. For example, the origin-destination pairs for the vehicle may be filtered by travel between the same two locations at the same time of day (e.g., travel between work and home). The status of the vehicle as stationary may be used to identify work and home locations by filtering the length of time and the times at which the vehicle is stationary. The locations where the vehicle is stationary may also be filtered by type of location. For example, a person associated with the vehicle may frequent the same convenience stores, grocery stores, filling/charging stations, etc. In some embodiments where the person is an operator of the vehicle, an operation, or group of operations, may be used to identify characteristics unique to the operator driving style as the extracted first values.

In some embodiments, the vehicle operating information may be supplemented by other information associated with infrastructure devices in response to detecting a respective vehicle. For example, an infrastructure device may be a smart parking meter, a traffic camera, a building access device, or any other non-vehicle device associated with the transportation network information and capable of detecting, or being detected by, the vehicle. This supplementary information may include location information identifying a location of the infrastructure device in the vehicle transportation network, a time, a date or both associated with the vehicle detecting or being detected by the infrastructure device, or a time, a date or both associated with the vehicle no longer being detected by or no longer detecting the infrastructure device.

The above examples provide a number of values that may be extracted from the vehicle operating information. The values may all be associated with one feature, for example, the person's home location, work location, origin-destination pair at a particular time or day or weekday, energy usage, etc. In some embodiments, the values may be associated with several features. Using more than one feature allows multiple patterns to be formed for more precise identification of the person.

In some embodiments, the person associated with the vehicle may be associated or correlated with patterns formed by the extracted values at 5300. The patterns could be formed as the location at which the vehicle is parked overnight a majority of times over each time window, summing the energy use over each time window arranged sequentially, summarizing origin-destination pairs over each time window, ranking the origin-destination pairs over each time window based on frequency of use, the location at which the vehicle is parked during the day for more than a minimum length of time, etc. Certain examples are discussed below with respect to FIGS. 7-9. At this time, or later in the method of FIG. 5, an association of the person with the transportation network information may be updated. For example, the person may be associated with the locations within the pattern.

In some embodiments, second values are extracted from second vehicle operating information from the vehicle at 5400. This extraction may occur over the same or similar consecutive time windows. For example, if the first values are extracted over monthly periods, the second values may be extracted over one or more monthly periods. In some embodiments, the values extracted are values for the same feature or features used to form the patterns at 5300.

The first values may be compared with the second values at 5500. In some embodiments, this may involve comparing the second values to patterns formed by the first values. In one implementation, the pattern may be generated using network theory. For example, ranking schemes such that those applied in social network analysis may be utilized. Machine learning and probabilities may be used for the comparison. In some embodiments, a logistic regression model may be used to predict a binary outcome (true-false or 0-1), here a change in person associated with the vehicle such as a probability of ownership change, given the learning data. The changes in the data may also be fed into a model that provides an output on a scale such as 0 to 1, where the closer the output is to 1, the more likely the person associated with the vehicle has changed. Through this output, whether or not the person has changed can be determined at 5600.

In some embodiments, an association of the person with a portion of the transportation network information may be updated at 5700. If the person is not previously associated with a portion of the transportation network information, the association may be added to the transportation network information. For example, the portion may be one or more locations within the transportation network information. In some embodiments, other associations may be stored with the transportation network information such as the energy use of the vehicle. When person is already associated with the portion of the transportation network information, that association may be changed based on the comparison. For example, a work location associated with the person may be updated. When the determination at 5600 is that the person associated with the vehicle has changed, updating the association at 5700 could involve disabling access of the previous person to new associations formed by the new person, disabling access of the new person to associations formed by the previous person, changing an existing association with data from the new person, etc.

Figure 7:
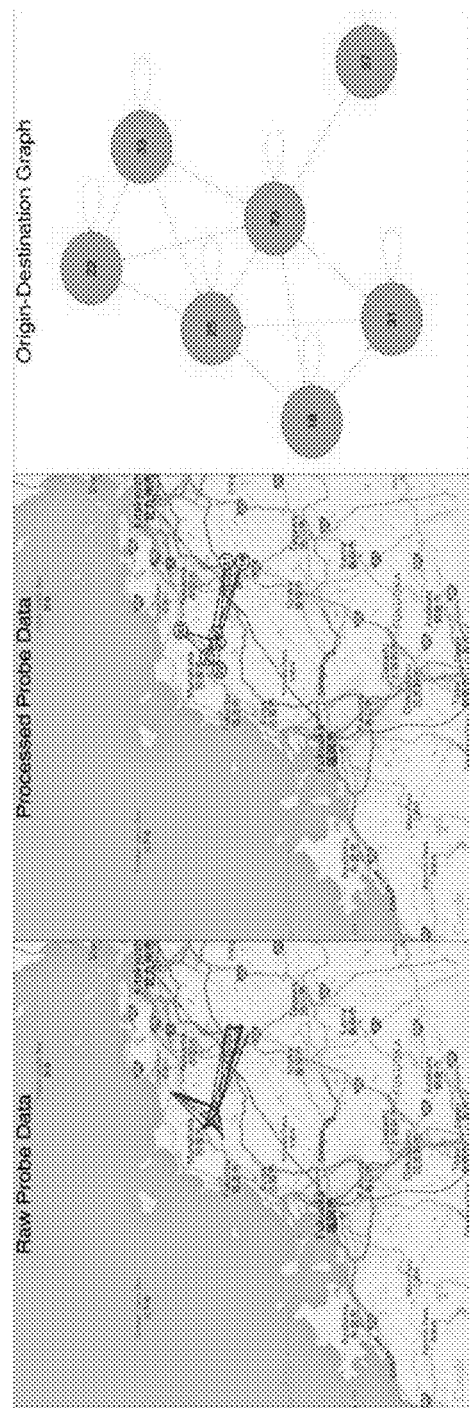
FIG. 7 is a diagram of the origin-destination graph of FIG. 6C highlighted to show the results of filtering the processed probe data in accordance with one implementation herein.

In some embodiments, data from a vehicle as shown in FIGS. 6A-6C may be used for forming the associations described herein. FIG. 6A is a diagram of raw probe data 6100 overlaid on a display of map data 6200 used to form the vehicle transportation network. The raw probe data 6100 includes trips between various origins and destinations. FIG. 6B is a diagram of the probe data 6100 of FIG. 6A processed in accordance with this disclosure. The processed probe data identifies each of the origins and destinations. The identification may include unique identifiers for each of location 6300 forming the origins and destinations. FIG. 6C is a diagram of an origin-destination graph using the processed probe data of FIG. 6B. More specifically, FIG. 6C shows all of the origin-destination pairs over a set of time windows excluding those filtered for relevance (i.e., a location used minimally as an origin or destination is excluded). Each location 6300 of an origin has a line drawn between it and a destination. Due to sampling periods and/or filtering, the origin and the destination may be the same location in some circumstances. This is shown in FIG. 6C for locations FIG. 7 is a diagram of the origin-destination graph of FIG. 6C highlighted to show the results of filtering the processed probe data in accordance with one implementation herein. In this implementation, each of the locations 6300 is ranked based on overnight parking events. Overnight parking events rank the locations 6300 by comparing each location for which the single vehicle is stationary for a defined time period, such as at least three hours, during a defined portion of the day, such as nighttime hours. As each location 6300 is added to the accumulated data, it is assessed as to the probability of whether it represents a change in the location of the person associated with the vehicle. In FIG. 7, location 23 is the location within the vehicle transportation map that most likely represents the person's home location based on this probe data.

Figure 8:
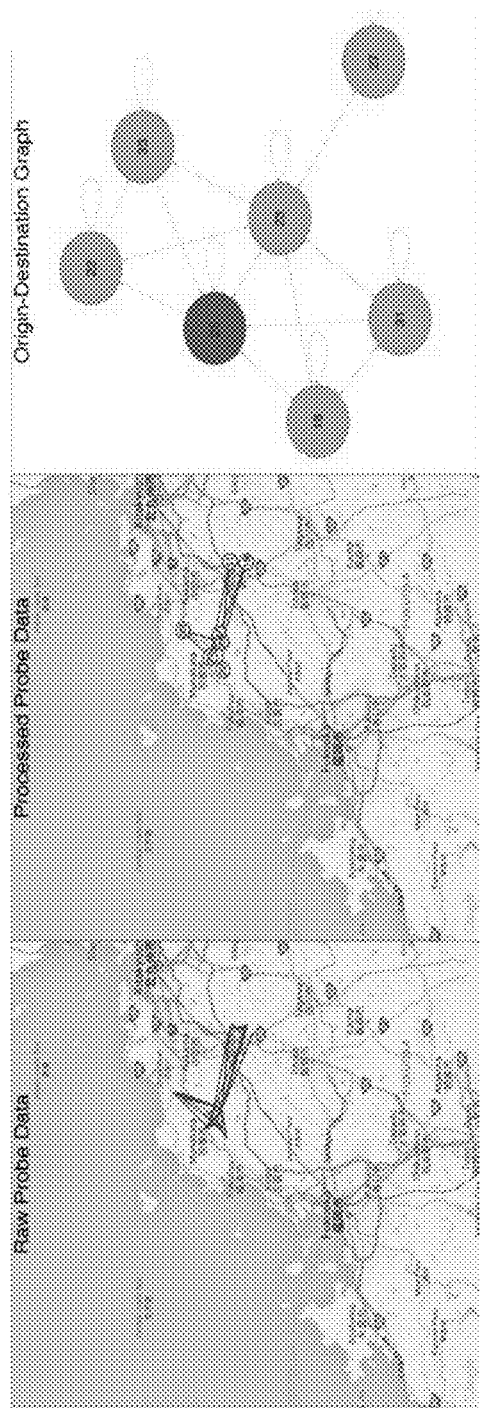
FIG. 8 is a diagram of the origin-destination graph of FIG. 6C highlighted to show the results of filtering the processed probe data in accordance with another implementation.

FIG. 8 is a diagram of the origin-destination graph of FIG. 6C highlighted to show the results of filtering the processed probe data in accordance with another implementation herein. In this implementation, each of the locations 6300 is ranked based on weekday daytime long-term parking events. For example, each location 6300 is assessed for its conformance with the conditions that the vehicle arrived at the location 6300 in the morning hours (such as between 6 AM and 12 noon) on a weekday and was stationary for more than a defined time period, such as three hours. As each location 6300 is added to the accumulated data, it is assessed as to the probability of whether it represents a change in the location of the person associated with the vehicle. In FIG. 8, location 25 is the location within the vehicle transportation map that most likely represents the person's work location based on this probe data.

Figure 9:
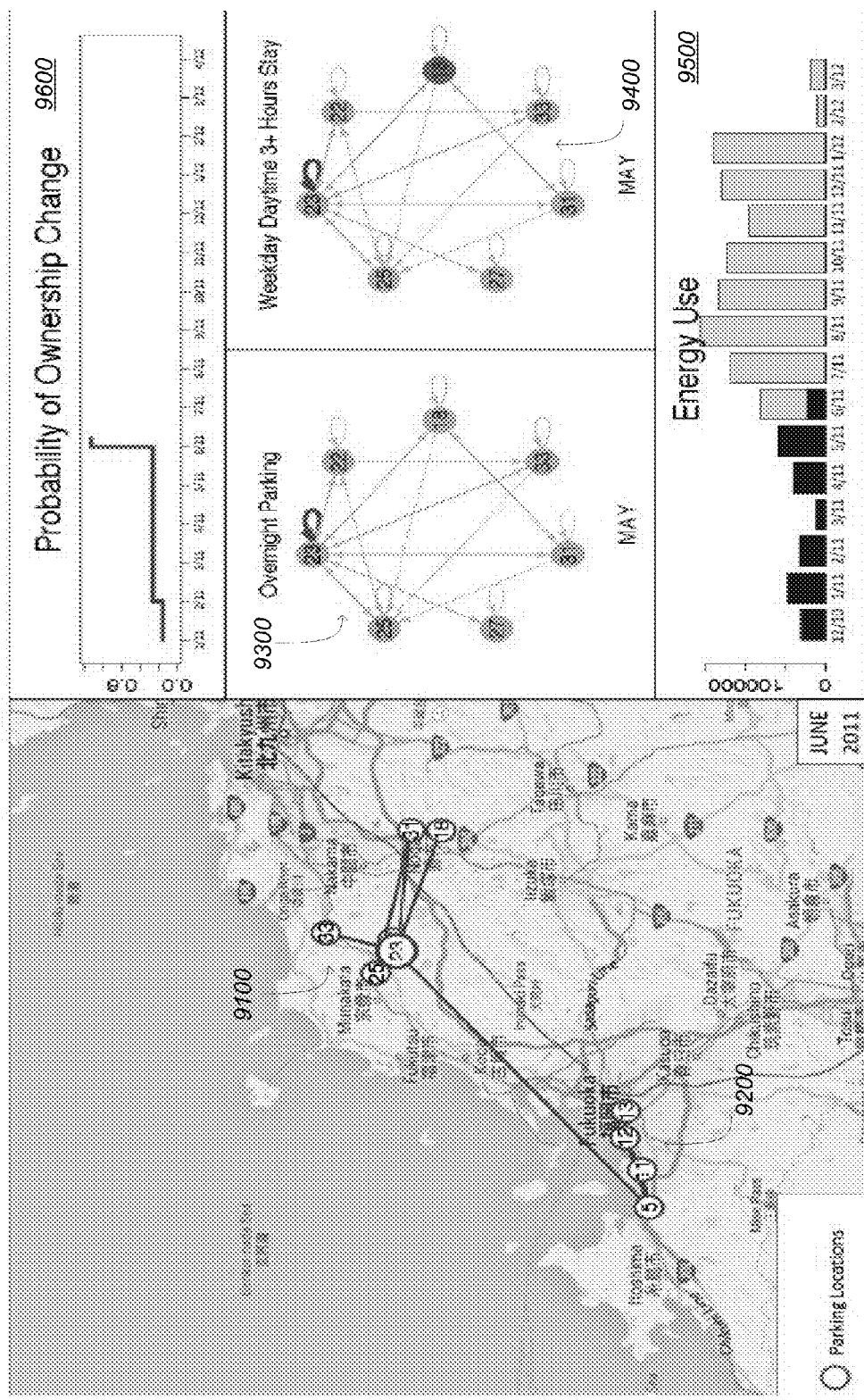
FIG. 9 is a diagram of a display demonstrating a probability of ownership change in accordance with this disclosure.

FIG. 9 is a diagram of a display demonstrating a probability of ownership change in accordance with this disclosure. The locations 9100 may correspond to the probe data 6100 extracted and processed as in FIGS. 6A-6C over a first set of time windows. In this case, the data is accumulated on a month-by-month basis. The locations 9200 may correspond to probe data extracted and processed over a second set of time windows. Two origin-destination graphs 9300, 9400 respectively represent the change in probe data over time ranked similarly to FIGS. 7 and 8. Graph 9300 demonstrates that location 23 is the location within the vehicle transportation map that most likely represents the person's home location based on this probe data. However, graph 9400 demonstrates that location 18 is the location within the vehicle transportation map that most likely represents the person's work location based on this probe data. FIG. 9 also includes a graph 9500 of energy use for two sets of consecutive monthly periods. The second set is updated only through the month of May. This graph 9500 demonstrates a significant reduction in energy use.

Together, the data forming graphs 9300/9400/9500 is used to calculate a probability of ownership change. The probability is generated over each monthly period as shown in the graph 9600 of FIG. 9. While a change to the work location and the reduction in energy usage increases the probability of a change in the person associated with the vehicle, it is not definitive. The change may be associated with a change in job for the same person, especially due to the lack of change in the home location. The accuracy of the conclusion may be increased by increasing the number of features considered.

In certain implementations, for each time window a feature such as a home location, work location, energy use, and so on may be developed. To calculate the location-based features, a ranking scheme as used in social networking analysis may be used. Values for the features may be calculated for each time window and compared with the same feature in the next time window. The difference of the feature across each time window may be input to a logistic regression model provide a reasoning as to whether a change has taken place or not as discussed previously. The logistic regression model may be developed using known and confirmed instances of ownership change and no ownership change. To develop the logistic regression model, probe data (and other data sources) for known vehicles may be used for extracting previously defined features. The differences in respective features over time may be found and given to a training algorithm with the label of ownership change or no ownership change. The training algorithm develops the reasoning of when an (e.g., ownership) change occurs using known results. While a logistic regression model is described to provide this reasoning, any supervised machine learning technique can be used to develop the model in a similar way.

The above-described aspects, examples and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:
1. A vehicle comprising:
 a processor configured to execute instructions stored on a non-transitory computer readable medium to:
  identify vehicle transportation network information representing a vehicle transportation network, wherein the vehicle transportation network includes a plurality of destinations, and wherein identifying the vehicle transportation network information includes identifying the vehicle transportation network information such that the vehicle transportation network information describes an association of a portion of the vehicle transportation network with a person associated with the vehicle based at least in part on an automatically identified association between the person associated with the vehicle and vehicle operating information of the vehicle;
  determine whether the person associated with the vehicle changes over time by:
   obtaining the vehicle operating information for the vehicle over defined time periods;
   extracting a plurality of features of the vehicle operating information for each of the time periods; and calculating a probability that the person associated with the vehicle has changed during each of the time periods by comparing respective features of the plurality of features for a time period with respective features for a previous time period;
determine a target destination from the plurality of destinations based on the vehicle transportation network information and the person associated with the vehicle; and
identify a route from an origin to the target destination in the vehicle transportation network using the vehicle transportation network information; and
a trajectory controller configured to operate the vehicle to travel from the origin to the target destination using the route, wherein the processor is configured to execute instructions stored on the non-transitory computer readable medium to automatically identify an association between the person and the vehicle operating information by:
obtaining an energy use of the vehicle during a first plurality of time windows;
summing the energy use occurring during each time window of the first plurality of time windows;
arranging the energy use sequentially in an order of the first plurality of time windows to form a pattern; and
associating the person with the pattern formed by the energy use during the first plurality of time windows.

2. The vehicle of claim 1, wherein the processor is configured to execute instructions stored on the non-transitory computer readable medium to determine whether the person associated with the vehicle changes over time by:
obtaining an energy use of the vehicle during a second plurality of time windows;
comparing the energy use during the second plurality of time windows with the pattern; and
determining that the person associated with the vehicle changed after an end of the first plurality of time windows based on changes in the energy use during the second plurality of time windows as compared to the pattern.

3. The vehicle of claim 2, wherein the processor is configured to execute instructions stored on the non-transitory computer readable medium to update the association of the portion of the vehicle transportation network with the person responsive to determining that the person associated with the vehicle changed.

4. The vehicle of claim 1, wherein the processor is configured to execute instructions stored on the non-transitory computer readable medium to automatically identify an association between the person and the vehicle operating information by:
obtaining a plurality of origin-destination pairs for the vehicle during a first plurality of time windows, each of the plurality of origin-destination pairs comprising a location within the vehicle transportation network from which the vehicle departs for a trip paired with a location within the vehicle transportation network at which the vehicle arrives at an end of the trip; and
associating the person with a pattern formed by the plurality of origin-destination pairs over the first plurality of time windows.

5. The vehicle of claim 4, wherein the processor is configured to execute instructions stored on the non-transitory computer readable medium to form the pattern by:
ranking the plurality of origin-destination pairs by frequency of occurrence; and
omitting an origin-destination pair of the plurality of origin-destination pairs from the pattern when a frequency of occurrence of the origin-destination pair is below a minimum value.

6. The vehicle of claim 4, wherein the processor is configured to execute instructions stored on the non-transitory computer readable medium to automatically identify an association between the person and the vehicle operating information by:
obtaining a plurality of origin-destination pairs of the vehicle during a second plurality of time windows;
comparing the origin-destination pairs obtained during the second plurality of time windows with the pattern; and
determining that the person associated with the vehicle changed after an end of the first plurality of time windows based on changes in locations of the origin-destination pairs during the second plurality of time windows as compared to the pattern; and wherein the processor is configured to execute instructions stored on the non-transitory computer readable medium to update the association of the portion of the vehicle transportation network with the person responsive to determining that the person associated with the vehicle changed.

7. The vehicle of claim 1, wherein the processor is configured to execute instructions stored on the non-transitory computer readable medium to automatically identify an association between the person and the vehicle operating information by:
obtaining at least one location at which the vehicle is stationary for more than a minimum time period during a first plurality of time windows; and
associating the person with a pattern formed by the at least one location during the first plurality of time windows.

8. The vehicle of claim 7, wherein the first plurality of time windows comprises each of a plurality of consecutive months and wherein the processor is configured to execute instructions stored on the non-transitory computer readable medium to form the pattern by filtering the at least one location by at least one of a time of day, and day of the week, and a minimum number of hours for which the vehicle is stationary at the at least one location.

9. The vehicle of claim 8, wherein the time of day is arrival at a destination during morning hours, the day of the week includes weekdays, and the minimum number of hours is at least three hours.

10. The vehicle of claim 8, wherein the time of day is nighttime and the minimum number of hours is at least three hours.

11. The vehicle of claim 1, wherein the vehicle is an autonomous vehicle.

12. The vehicle of claim 1, wherein the plurality of features comprise location-based features that identify a time and a duration at a location, and the processor is configured to execute instructions stored on the non-transitory computer readable medium to determine whether the person associated with the vehicle changes over time by:
calculating the probability by determining whether a location obtained in the time period represents a change in location from the previous time period.

13. A vehicle comprising:
a processor configured to execute instructions stored on a non-transitory computer readable medium to:
identify vehicle transportation network information representing a vehicle transportation network, wherein the vehicle transportation network includes a plurality of destinations, and wherein identifying the vehicle transportation network information includes identifying the vehicle transportation network information such that the vehicle transportation network information describes an association of a portion of the vehicle transportation network with a person associated with the vehicle based at least in part on an automatically identified association between the person associated with the vehicle and vehicle operating information of the vehicle, wherein the portion of the vehicle transportation network includes at least some of the plurality of destinations;

determine a change in the person associated with the vehicle, based at least in part by:
  obtaining an energy use of the vehicle during a first plurality of time windows;
  summing the energy use occurring during each time window of the first plurality of time windows;
  arranging the energy use occurring during each time window of the first plurality of time windows in a first sequence of energy use over time;
  obtaining the energy use of the vehicle during a second plurality of time windows subsequent to the first plurality of time windows;
  summing the energy use occurring during each time window of the second plurality of time windows;
  arranging the energy use occurring during each time window of the second plurality of time windows in a second sequence of energy use over time; and
  determining that the second sequence of energy use over time is different from the first sequence of energy use over time;

determine a target destination from the plurality of destinations based on the vehicle transportation network information, the target destination based on the change in the person associated with the vehicle; and identify a route from an origin to the target destination in the vehicle transportation network using the vehicle transportation network information; and a trajectory controller configured to operate the vehicle to travel from the origin to the target destination using the route.

14. The vehicle of claim 13, wherein the processor configured to execute instructions stored on a non-transitory computer readable medium to determine the change in the person associated with the vehicle by:
  identifying first vehicle operating information for the vehicle, wherein the first vehicle operating information includes a first plurality of vehicle operations occurring during a first plurality of time windows;
  extracting first values for a plurality of features from the first plurality of vehicle operations;
  associating a portion of the vehicle transportation network with the person associated with a single vehicle based on the first values;
  for consecutive time windows after the first plurality of time windows, extract second values for the plurality of features from second vehicle operating information for the vehicle, wherein the second vehicle operating information includes a second plurality of vehicle operations occurring during the consecutive time windows; and
  determining that an identity of the person associated with the vehicle has changed over time based on changes between the second values for the plurality of features and the first values for the plurality of features.

15. A system for generating vehicle transportation network information, the system including:

a memory including a non-transitory computer readable medium; and a processor configured to execute instructions stored on the non-transitory computer readable medium to:
  identify vehicle transportation network information representing a vehicle transportation network, the vehicle transportation network information including a plurality of destinations;
  identify first vehicle operating information for a single vehicle, wherein the first vehicle operating information includes a first plurality of vehicle operations occurring during a first plurality of time windows;
  extract first values for a plurality of features from the first plurality of vehicle operations;
  associate a portion of the vehicle transportation network with a person associated with the single vehicle based on the first values;
  for consecutive time windows after the first plurality of time windows, extract second values for the plurality of features from second vehicle operating information for the single vehicle, wherein the second vehicle operating information includes a second plurality of vehicle operations occurring during the consecutive time windows;
  determine whether an identity of the person associated with the single vehicle has changed over time based on changes between the second values for the plurality of features and the first values for the plurality of features; and
  responsive to determining that the identity of the person has changed, remove an association of the portion of the vehicle transportation network within the vehicle transportation network information with the person associated with the single vehicle.

16. The system of claim 15, wherein the processor is configured to execute instructions stored on the non-transitory computer readable medium to determine whether the identity of the person associated with the single vehicle has changed over time based on changes between the second values for the plurality of features and the first values for the plurality of features by:
  generating a probability value based on the changes between the second values and the first values.

17. The system of claim 15, wherein the processor is configured to execute instructions stored on the non-transitory computer readable medium to:
  identify the first vehicle operating information for the single vehicle by identifying a plurality of origin-destination pairs occurring during the first plurality of time windows;
  extract the first values for a plurality of features from the first plurality of vehicle operations by extracting a location of the origin and a location of the destination for the plurality of origin-destination pairs by filtering out those origin-destination pairs occurring below a minimum number of times in the first vehicle operating information; and
  extract the second values for the plurality of features by extracting a location of the origin and a location of the destination for a plurality of origin-destination pairs from the second vehicle operating information for the single vehicle.

18. The system of claim 15, wherein the processor is configured to execute instructions stored on the non-transitory computer readable medium to:

identify the first vehicle operating information for the single vehicle by identifying a plurality of origin-destination pairs occurring during the first plurality of time windows;

extract the first values for a plurality of features from the first plurality of vehicle operations by extracting a time at which a first destination of the plurality of origin-destination pairs is reached and a length of time for which the single vehicle remains stationary at the first destination; and extract the second values for the plurality of features by extracting a time at which a second destination of a plurality of origin-destination pairs from the second vehicle operating information for the single vehicle is reached and a length of time for which the single vehicle remains stationary at the second destination.

* * * * *